United States Patent [19]

Rodal

[11] Patent Number: 5,408,193
[45] Date of Patent: Apr. 18, 1995

[54] ACTIVE CIRCUIT FILTER FOR REDUCING CONDUCTED RADIATION FROM A LOAD BACK TO ITS POWER SUPPLY

[75] Inventor: Eric B. Rodal, Cupertino, Calif.

[73] Assignee: Trimble Navigation Limited, Sunnyvale, Calif.

[21] Appl. No.: 116,896

[22] Filed: Sep. 3, 1993

[51] Int. Cl.$^6$ .......................... H03K 17/00; H03B 5/20
[52] U.S. Cl. ........................................ 327/559; 330/107
[58] Field of Search ............... 307/556, 520, 521, 542, 307/542.1, 543; 328/167; 330/109, 107; 323/186, 190

[56] References Cited

U.S. PATENT DOCUMENTS

| | | | |
|---|---|---|---|
| 2,973,439 | 2/1961 | Wright | 307/543 |
| 2,995,697 | 8/1961 | Grenier | 307/543 |
| 3,026,469 | 3/1962 | Wilbur | 307/543 |
| 3,870,905 | 3/1975 | Chikazawa | 307/542.1 |

*Primary Examiner*—Timothy P. Callahan
*Assistant Examiner*—Dinh Le
*Attorney, Agent, or Firm*—Thomas E. Schatzel

[57] ABSTRACT

An embodiment of the present invention comprises a series pass transistor with its emitter arranged to receive a source of DC power, its collector arranged to supply a DC load, and its base connected to the junction of a capacitor to ground and an inductor to the collector. An output capacitor from the collector to ground is alternatively included. In a second embodiment of the present invention, an operational amplifier is inserted in the base circuit to increase the effective circuit gain.

2 Claims, 2 Drawing Sheets

ACTIVE CIRCUIT FILTER FOR REDUCING CONDUCTED RADIATION FROM A LOAD BACK TO ITS POWER SUPPLY

BACKGROUND OF THE INVENTION

1. Field of the Invention

The invention relates generally to power supplies and more specifically to active circuits used as filters for controlling conducted radiation, such as the coupling of noise generated by switching power supplies back into their sources of power.

2. Description of the Prior Art

A common technique for distributing electrical power around a vehicle, vessel and even a building involves stringing an unregulated power supply bus around to all the points that will consume power and then to place a voltage regulator at each of the points of consumption. Each individual voltage regulator can then supply an appropriate voltage to its respective load.

Switching power supplies have become popular because they offer high efficiency and can produce voltages above or opposite to the incoming power source voltage. However, switching power supplies can generate noise that is both radiated and directly coupled to its inputs and outputs. With higher power levels, the generated noise can be very energetic and difficult to control. The radiated noise can typically be controlled with proper shielding and the conducted noise is conventionally filtered out. Without adequate filtering, an unregulated common power source can couple noise between equipment loads and cause erratic operation. Highly sophisticated gear tends to be the most susceptible, in particular to their highly sensitive radio receivers, such as used in navigation instrumentation.

Capacitors and inductors, and even capacitor and resistor combinations have long been used in pi-network and T-network configurations to construct filters. However, capacitors and inductors large enough to control noise in distributed-point regulation configurations can be bulky and expensive.

Conventional filters have been designed to filter out AC to DC rectification chop to provide a smoothed voltage to a load downstream of the power supply. An unusual situation is encountered in distributed-point regulation configurations because the smoothing is required upstream of the load, in particular, upstream of the switching power supply and its associated load. This requirement is opposite to what has been the conventional circuit design problem.

SUMMARY OF THE PRESENT INVENTION

It is therefore an object of the present invention to provide a filter for the control of conducted noise from a switching power supply back to its source of power.

Briefly, an embodiment of the present invention comprises a series pass transistor with its emitter arranged to receive a source of DC power, its collector arranged to supply a DC load, and its base connected to the junction of a capacitor to ground and an inductor to the collector. An output capacitor from the collector to ground is alternatively included. In a second embodiment of the present invention, an operational amplifier is inserted in the base circuit to increase the overall circuit gain.

An advantage of the present invention is that a filter is provided that is effective in controlling noise.

Another advantage of the present invention is that a filter is provided that is economical to manufacture.

A further advantage of the present invention is that a filter is provided that is small in bulk.

A still further advantage of the present invention is that a circuit for a filter is provided that can be easily integrated into a semiconductor chip that includes a switching regulator integrated circuit.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
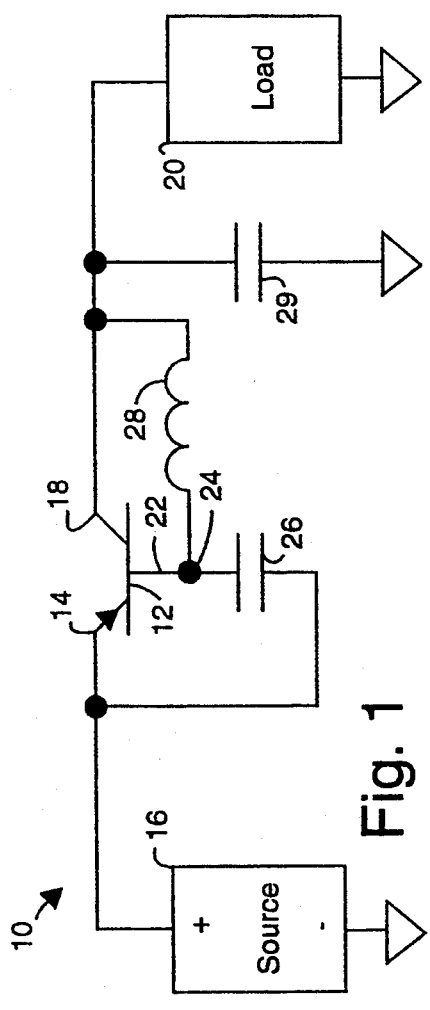
FIG. 1 is a schematic diagram of DC power supply filter embodiment of the present invention.

FIG. 1 illustrates a DC power supply filter embodiment of the present invention, referred to herein by the general reference numeral 10. Power supply filter 10 comprises a series pass PNP type bipolar transistor 12 with an emitter 14 arranged to receive a positive connection of a DC power source 16, a collector 18 arranged to supply a DC load 20, and a base 22 connected to a junction 24 of a capacitor 26 connected to ground and an inductor 28 connected to the collector 18. An output capacitor 29 from the collector to ground is alternatively included. DC power source 16 will typically deliver an unregulated voltage in the range of 9–36 volts and will additionally supply other loads that need to be protected by power supply filter 10 from noise generated in load 20. Good results have been obtained when capacitor 26 was selected to be a 4.7 microfarad (MFD), fifty volt electrolytic, and inductor 28 was chosen to be 1000 microhenries ($\mu$H). Transistor 12 may be a bipolar junction type 2N2907. The current through transistor 12 ranged between 50–200 milliamperes (mA).

Figure 2:
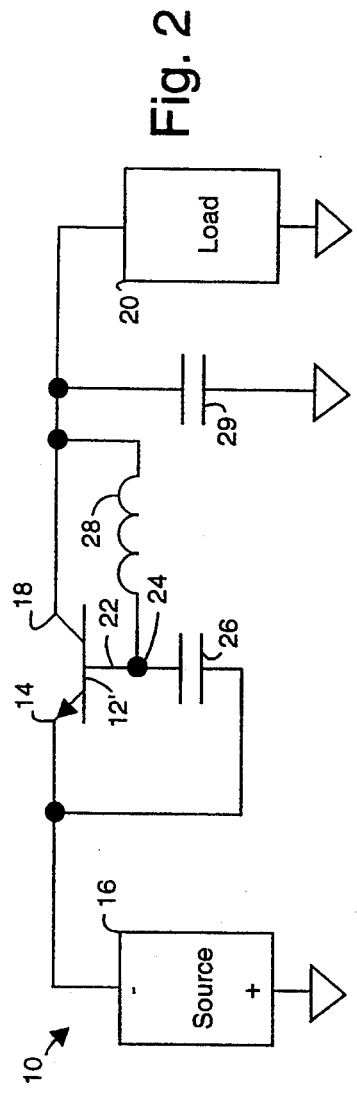
FIG. 2 is a schematic diagram of an alternative DC power supply filter similar to that of FIG. 1.

The DC power source may be reversed, as in FIG. 2, to provide a negative supply terminal input. In such a case, an NPN type bipolar transistor 12' would be substituted for the transistor 12 of FIG. 1.

In operation, DC bias supplied to base 22 will normally keep transistor 12 turned on and in its active region. Inductor 28 will present a high impedance to high frequency noise coming from load 20 and will tend to resist turning transistor 12 on harder for positive swings and to resist lessening current through transistor 12 for negative swings of the noise. Capacitor 26 acts in concert with inductor 28 by presenting a low impedance to ground for high frequency noise at the base 22 and a high impedance for DC.

Noise coming in from DC power supply 16 will couple through from emitter 14 to collector 18 because transistor 12 presents itself in a common-base configuration and therefore has little or no effect in filtering out noise from upstream. This is the opposite of a conventional active filter which would reverse the collector and emitter connections and use an NPN type transistor for positive power supply inputs.

Figure 3:
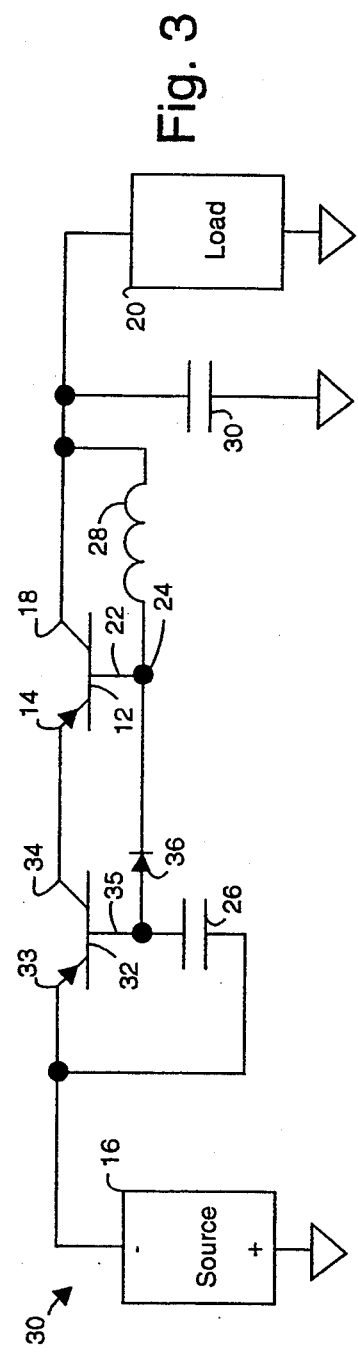
FIG. 3 is a schematic diagram of a cascode DC power supply filter similar to that of FIG. 1.

FIG. 3 illustrates a cascode filter embodiment of the present invention, referred to by the general reference numeral 30. Filter 30 is similar to filter 10 and further includes a transistor 32 with an emitter 33, a collector 34 and a base 35. A diode 36 provides bias for transistor 12.

Figure 4:
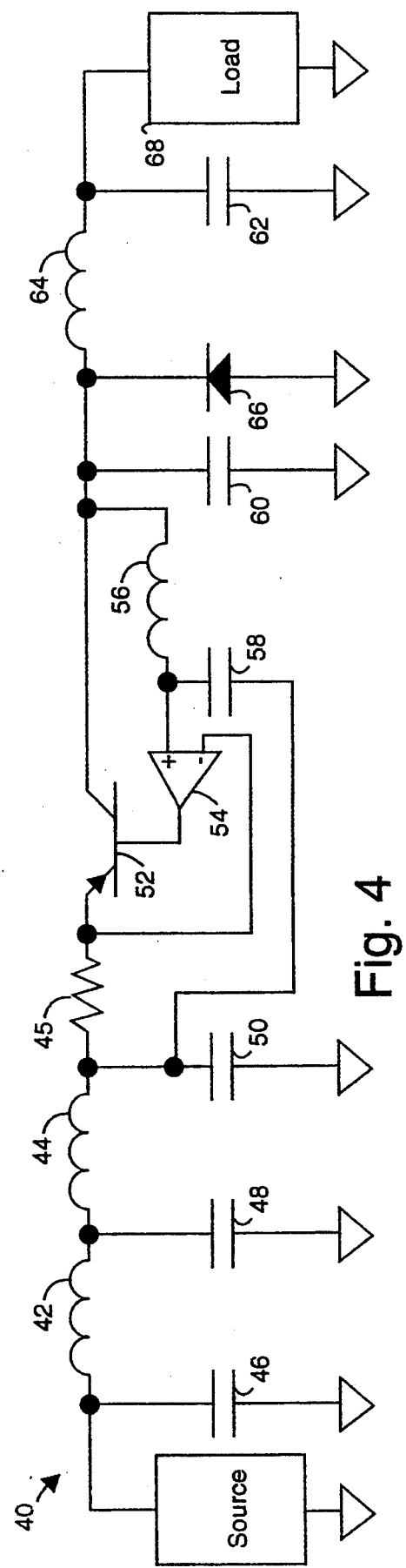
FIG. 4 is a schematic diagram of DC power supply embodiment of the present invention.

In another embodiment of the present invention, as illustrated in FIG. 4, a DC power supply 40 includes a pair of inductors 42 and 44 in series, a resistor 45, a series of input capacitors 46, 48 and 50 connected to ground, a transistor 52, an operational amplifier (op-amp) 54 inserted in the base circuit of transistor 52 to increase the overall circuit gain, an inductor 56 in series connection with a capacitor 58, a pair of output capacitors 60 and 62, an output inductor 64 and a diode 66. Inductors 42 and 44, and capacitors 46, 48 and 50 provide input filtering. Op-amp 54 improves the effective gain of transistor 52 and can improve the response to noise coming from a load 68. Since op-amps have limited high frequency performance compared to a single transistor, a high-frequency response type op-amp may be appropriate for use as op-amp 54 in particular applications. Good results have been obtained when capacitor 50 was comprised of two 4.7 MFD capacitors rated for fifty volts, capacitor 58 was a single 4.7 MFD capacitor also rated at fifty volts, and transistor 52 as a type 2N2907. Op-amp 54 may be omitted in certain high frequency applications or those not needing the higher gain.

Figure 5:
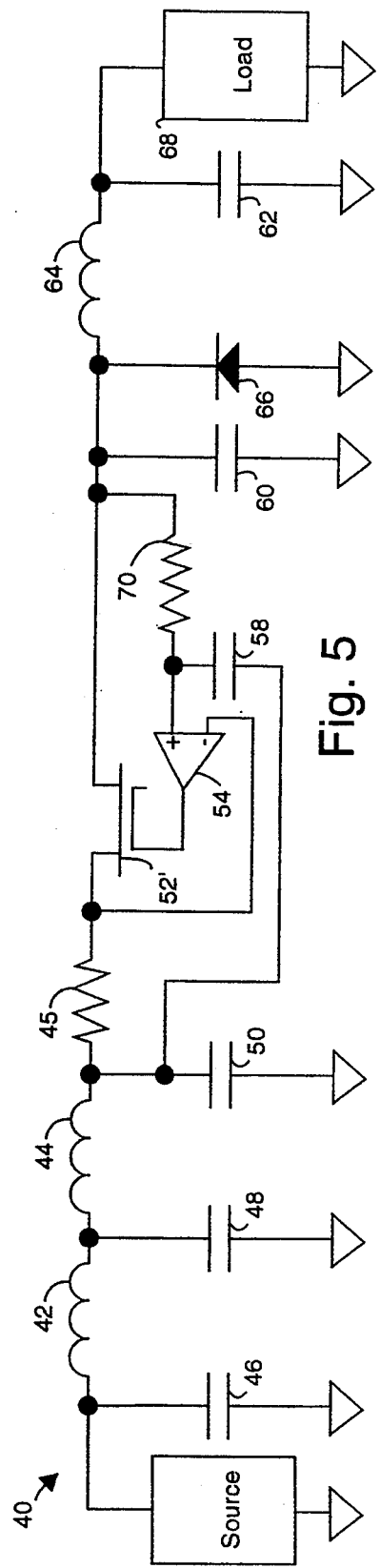
FIG. 5 is a schematic diagram of an alternative DC power supply similar to that of FIG. 4.

Transistor 52 may also be a field effect transistor (FET) type, shown as transistor 52' in FIG. 5, with appropriate connections for the source, drain and gate that respectively match connections for emitter, collector and base of transistor 52 in FIG. 4. Inductor 56 may be substituted by a resistor 70, as shown in FIG. 5.

In general, any active device having a control input may be connected between a power supply input terminal and output terminal such that a load current passes through the active device and can be regulated by it. A passive filter network, such as a capacitor-inductor combination or a capacitor-resistor combination, is connected to the control input and between the input and output terminals. In operation, the relatively higher frequencies of load current will be attenuated more than relatively lower frequencies. Therefore, the conducted radiation from the load to the power supply will be reduced or completely eliminated.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A power supply filter for blocking the coupling of noise generated in a DC load by a switching power supply from coupling back to an input source of DC power, comprising:
   a bipolar junction transistor with an emitter coupled to an input power supply connection, a collector coupled to an output load connection and a base;
   a capacitor connected between said base and a ground common;
   said impedance means connected between said base and said collector for supplying a DC bias current to said base to turn on the transistor and for dropping noise voltages coming in from said output load connection, wherein noise generated in said DC load is inhibited from coupling upstream to said input source of DC power; and
   an operational amplifier (op-amp) inserted between said base and a junction of the capacitor and said impedance means such that an output of the op-amp drives said base, a non-inverting input connects to said junction and an inverting input connects to said emitter, wherein the effective gain of the transistor is increased.

2. A power supply filter for blocking the coupling of noise generated in a DC load by a switching power supply from coupling back to an input source of DC power, comprising:
   a field effect transistor (FET) with a source coupled to an input power supply connection, a drain coupled to an output load connection and a gate;
   a capacitor connected between said gate and a ground common;
   said impedance means connected between said gate and said drain for supplying a DC bias current to said gate to turn on the FET and for dropping noise voltages coming in from said output load connection, wherein noise generated in said DC load in inhibited coupling through back upstream to said input source of DC power; and
   an operational amplifier (op-amp) inserted between said gate and a junction of the capacitor and said impedance means such that an output of the op-amp drives said gate, a non-inverting input connects to said junction and an inverting input connects to said source, wherein the effective gain of the FET is increased thereby.

* * * * *